United States Patent Office 2,997,399
Patented Aug. 22, 1961

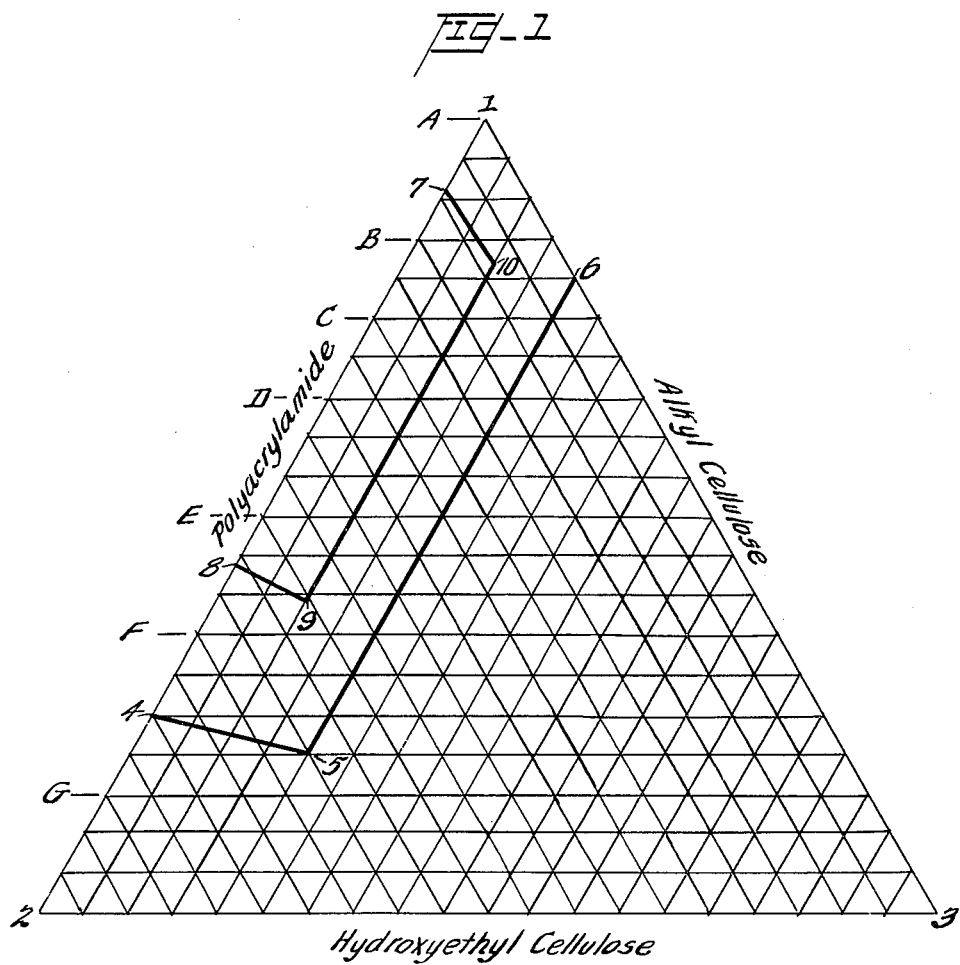

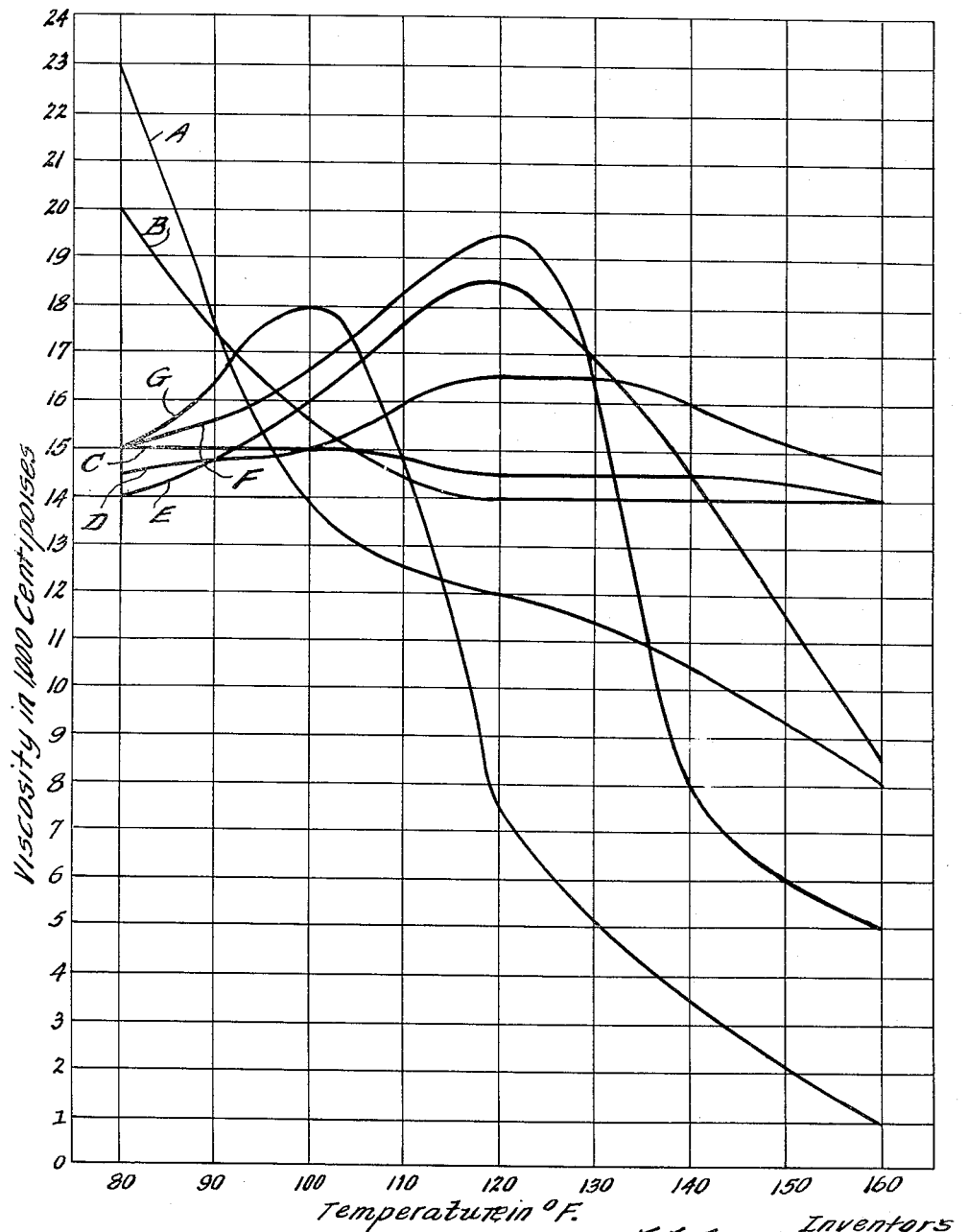

2,997,399
DENTURE ADHESIVE COMPOSITION
Genevieve B. Eberhard and Frank T. Friedl, Tulsa, Okla., assignors to Polymed Laboratories, Incorporated, Tulsa, Okla.
Filed June 20, 1958, Ser. No. 743,317
14 Claims. (Cl. 106—35)

This invention relates to the art of adhesive compositions and is more particularly directed to an adhesive composition especially adapted for use in securing a denture or dental plate in proper position in the mouth of the wearer.

The use of denture adhesives is now widespread, such adhesives generally promoting the adherence of the denture or the like to the gums and/or other oral surfaces of the wearer and the ease and comfort with which such dental accessories are worn. Compositions of this type that have been proposed and are in use at the present time, for the most part, derive their adhesiveness from the presence of natural gums such as karaya, tragacanth and locust bean gums, which are believed to be complex carbohydrates. Whatever their chemical structure may be, it is known that these gums swell in the presence of a small amount of water to form a hydrophilic colloid, gel, or jelly. Other materials, such as dextrin and casein are sometimes used, and while differing in chemical make-up from the natural gums, these substances also have the characteristic of forming colloidal solutions in water. The adhesive properties exhibited by all of these materials is attributable to the fact that aqueous solutions thereof are quite viscous. It is of course, to be understood that the use of the term "solution" or equivalent in connection with colloids and/or gels may not be entirely accurate, in a strict sense. However, the distinction between a true solution and a colloidal solution is quite arbitrary, being based upon the diameter of the particle in dispersion, and, for ease and convenience of description, a term such as this will be employed herein without reference to this distinction.

One can readily appreciate that the oral cavity is necessarily exposed to a wide range of conditions, particularly over long periods of time. Thus, during consumption of an iced dessert or beverage the temperature of the oral surfaces may approach the freezing point of water while with hot beverages or soups the temperature may rise to near the boiling point of water. In like fashion, the pH of the variety of foods, beverages, condiments and so forth that constitute the modern day diet may and does range from distinctly alkaline to substantially acid. Foods also vary widely in chemical characteristics other than pH and there are contained in the items of the modern diet numerous compounds of diverse properties which are available for reaction with any foreign substance present in the mouth. Moreover, the mouth is a ready breeding ground for diverse bacteria and microorganisms deposited there from food, articles, or even air. One can therefore perceive that a denture adhesive must be capable of performing its function under extremely harsh and variable environmental conditions and, unfortunately, the natural gums and related materials are by nature rather poorly equipped to withstand these conditions. For instance, it is a matter of common chemical knowledge that complex carbohydrates, i.e., the natural gums and dextrin, will decompose on partial or complete hydrolysis to a mixture of aldohexoses and hexuronic acids; proteins, on the other hand, are known to break down completely upon hydrolysis to a mixture of amino acids. Such decomposition, naturally leads to destruction of the effectiveness of the adhesive composition in reducing the viscosity and, consequently, the adhesiveness of solutions thereof. Furthermore, the end products resulting from decomposition may actually promote the growth of microorganisms in the oral cavity which cause the breath to acquire an offensive odor and produce an undesirable state of oral hygiene in general.

The effectiveness as adhesives of hydrophilic colloids or gels of the natural materials mentioned above is also lessened by virtue of the fact that the viscosity of such colloids and gels is an inverse function of temperature. Hence, as the temperature of the oral surfaces is increased by the introduction of hot foods into the mouth, the viscosity of adhesive compositions based on these materials is materially lessened, reducing the effective adhesion between the denture and adjacent oral surfaces. With lessened viscosity, the adhesives may flow out from between the denture and oral surfaces into the mouth to become lost to the stomach or, being of diminished effectiveness as a barrier and no longer able to prevent the intrusion of mouth fluids or beverages between the denture and adjacent oral surfaces, may become diluted or washed away. The migration of food particles beneath the denture also becomes possible which is an extreme source of irritation to the wearer.

It has been established by Middleton, Quart. J. Pharm., 9, 493 (1936), that the viscosity of hydrophilic colloidal solutions is greatly reduced by mechanical agitation, due apparently to the actual breakdown of the physical structure of the colloid. During chewing the jaws, when brought together, are capable of developing pressure of surprisingly high magnitude, which pressure is transmitted to the denture through the artificial teeth and the food mass in the mouth. As the jaws are separated, the denture tends to pull away from the adjacent oral surface due to the vacuum set up in the mouth attendant to swallowing and to the cohesive nature of many foods. Consequently, the denture adhesive present between the denture and adjacent oral surfaces is constantly subjected to mechanical stress of a considerable order as the pressure upon it is built up and released as the food is masticated. Such stress apparently has an even greater deleterious effect upon the viscosity of the adhesive than simple mechanical agitation.

Perhaps the leading natural colloid-forming material employed in conventional denture adhesives is karaya gum. This gum develops optimum viscosity when dispersed in neutral water, the gel or colloid thus formed being acidic due to the inherent acidity of the gum. On the other hand, according to medical authority, oral tissue should preferably be maintained in a neutral to mildly alkaline state and it is a common expedient in the art to include in the adhesive compound an alkaline material, such as sodium bicarbonate, to adjust or buffer to neutrality the pH of the gel or colloid formed when the adhesive absorbs water from the mouth. Unfortunately, however, neutralization of a karaya gel alters the character of the gel in the direction of stringiness with an attendant loss of viscosity and adhesion.

For these reasons, and possibly others as well, conventional denture adhesives are found to be effective for a period of considerably less duration than one might desire, functioning satisfactorily usually no more than overnight or a few hours during the day when subjected to more drastic treatment. In addition, the benefit conferred by these adhesives may vary considerably with the particular eating habits and with variations in the diet of the wearer of the denture, and can, quite naturally, be a source of anxiety and dissatisfaction.

It is the principal object of the present invention to provide an adhesive composition for dentures or the like which is relatively free from these difficulties and disadvantages, providing materially improved adhesion and stability for substantially increased periods of time.

It is another object of this invention to provide a denture adhesive containing as essential constituents synthetic polymeric materials having physical and chemical properties that are especially selected for superior performance under, and better compatibility with, the variety of conditions encountered in the oral cavity.

A further object of the invention is the provision of a composition of the type described formulated principally of certain synthetic derivatives of cellulose that are mechanically stable, chemically non-ionic or neutral, and of demonstrably improved tenacity over an extreme range of chemical and physical conditions.

A still further object of the invention is an adhesive composition for dentures consisting of a mixture of active ingredients that are so compounded as to exhibit in admixture a viscosity that is relatively independent of temperature.

Other objects and advantages of the invention will be apparent from the following detailed description when read in conjunction with the accompanying diagrams, in which:

FIG. 1 is a triaxial diagram for mixtures of hydroxyethyl cellulose, methyl cellulose, and polyacrylamide in which the larger area encompasses combinations of these ingredients which have been found to be operative for the purpose of the invention and the smaller area encompasses the preferred proportions of the invention; and, FIG. 2 is a plot of viscosity versus temperature for various mixtures of hydroxyethyl cellulose and methyl cellulose in 5% concentration by weight in water, the mixture being identified as follows:

|   | Percent Hydroxyethyl Cellulose | Percent Methyl Cellulose |
| --- | --- | --- |
| A | 100 | 0 |
| B | 85 | 15 |
| C | 75 | 25 |
| D | 65 | 35 |
| E | 50 | 50 |
| F | 35 | 65 |
| G | 15 | 85 |

Points on FIG. 1 corresponding to the above are also indicated by A–G for convenience.

The principal ingredient of denture adhesives contemplated above by the present invention is hydroxyethyl cellulose having a certain degree of substitution of ethylene oxide groups per anhydro-glucose unit of the cellulose molecule. As is well known, ethylene oxide can be reacted with cellulose to produce hydroxyethyl ethers of cellulose. In the cellulose molecule, there are for each anhydro-glycose unit three hydroxyl groups available for reaction with ethylene oxide, and where up to three moles of ethylene oxide per anhydro-glucose unit are provided for the reaction, there will be obtained a corresponding number of hydroxyethyl groups coupled to the anhydroglucose unit through ether oxygen, the reaction being one of addition. Where the amount of ethylene-oxide exceeds three moles per anhydro-glucose unit of the cellulose any ethylene oxide in excess of three moles will couple with the already substituted hydroxyethyl groups to form polyoxyethylene chains terminating in an hydroxyethyl group. In this case, the cellulose molecule may be substituted by hydroxyethyl groups, in the strict sense, as well as hydroxyethyl-ethoxy, or -polyethoxy, groups. To avoid confusion in this description, where the term "degree of substitution" appears herein with reference to hydroxyethyl cellulose, it will be understood as indicating the number of ethylene oxide groups per anhydro-glucose unit of the cellulose even though some of these might be more properly described as "hydroxyethyl groups." Degree of substitution (hereinafter D.S.) must necessarily refer to an average value since the actual degree of substitution of any particular anhydro-glucose unit may vary considerably and cannot be exactly determined. As with any polymerization, the present reaction follows the law of probability and the average value will reflect the condition of the large majority of individual molecules. For the purposes of the present invention, hydroxyethyl cellulose having an average D.S. of between 0.4 and 4.5 ethylene-oxide groups per anhydroglucose unit are contemplated with an average D.S. between 1.5 and 3.0 being preferred. Below the minimum average of 0.4 hydroxyethyl cellulose exhibits a decreasing solubility in water, being soluble only in water that is alkaline in pH and does not absorb sufficient water to be suitable for use in the invention. Beyond the upper limit of D.S. 4.5, an effect of detergency appears and increases the further this limit is exceeded. At a D.S. of 6.0, hydroxyethyl cellulose is inferior in solubility to the karaya gum of the prior art. Within the lesser limits of 1.5 to 3.0, the solubility of hydroxyethyl cellulose is particularly suited for the purposes of the present invention and is preferred for this reason.

Information presently available indicates that ethylene oxide cannot be replaced by propylene oxide for substitution on the anhydro-glucose units of the cellulose molecules, at least as regards all or a substantial major portion of the ethylene oxide. The effect of this replacement is a shift in solubility away from aqueous solutions towards organic solvents. A substantially equivalent result might possibly be obtained by replacing only a minor proportion of the ethylene oxide groups with propylene oxide groups.

It is desirable that certain limits be placed on the molecular weight, or degree of polymerization, of the hydroxyethyl cellulose employed herein. A variety of procedures is available to the chemist for determining or estimating the molecular weight of various polymer solutions and cellulosic solutions in particular, but, unfortunately, these procedures do not always produce reproducible results or results that are in agreement with one another. Most reliable results seem to be obtained viscosimetrically, and, accordingly, molecular weight will be defined or estimated in terms of viscosity herein. It has been determined that a degree of polymerization of hydroxyethyl cellulose such as provides a viscosity of 1,000 to 6,000 centipoises for a 2% by weight concentration in distilled water, determined at 20° C. with a Brookfield viscosimeter using spindle 4 at 60 r.p.m. is satisfactory for the purposes of this invention. (The viscosimeter just referred to is available from the Brookfield Engineering Laboratories, Inc., 240 Cushing Street, Stoughton, Massachusetts.)

A composition containing hydroxy-ethyl cellulose, as defined above, as the only viscosity-producing component, but which might contain minor amounts of various additives, such as preservatives, bactericides, and the like, has been found to be quite operable as a denture adhesive and constitutes the simplest form of the present invention. The corner point 1 of the triaxial diagram (FIG. 1) represents such a composition. In FIG. 2, the curve designated A illustrates the variation in viscosity with temperature of an aqueous solution containing 5% by weight of hydroxyethyl cellulose having a D.S. of 1.8, the viscosity being determined with the viscosimeter already mentioned using the spindle 4 at 60 r.p.m. When the compositions of the present invention are applied to a denture in the form of an essentially dry powder and the denture placed in the mouth, about 90 to 95% of water or oral fluids is "absorbed" by the powder. That is to say, in the mouth the hydroxyethyl cellulose forms a gel or colloid having a solids content of somewhere between about 5–10% by weight. Gels having a solids content of 10% exhibit an extremely high viscosity, surpassing those levels at which an accurate measurement can be made and exceeding 100,000 centipoises except at the highest temperatures. It was for this reason that the 5% concentration was selected to illustrate variation of viscosity with temperature in these tests simulating the effect on the compositions of the invention of changes in mouth temperature. The curves in FIG. 2 are, therefore, probably indicative rather than precisely representative of what changes take place in the particular compositions under actual conditions of use as hot foods or beverages are introduced into the mouth.

It is, nevertheless, true that gels of hydroxyethyl cellulose even at solid content higher than 5% are subject to a loss of viscosity as the temperature increases. Thus, the statement can be made that the viscosity of colloids or gels of hydroxyethyl cellulose in general varies inversely with temperature. As can be seen from curve A, at the 5% solids level, this loss is greatest with temperatures changes below body temperature, i.e. about 100° F., and is relatively stable between 100° F. and 140° F., again falling off as higher temperatures are encountered. The effective viscosity, however, is sufficiently high for the composition to be a reasonably suitable adhesive, especially where very high temperatures are not encountered frequently. Moreover, the viscosity loss can be counteracted, at least in part, by using more of the gel forming compound to increase the effective solids content of the gel formed in the mouth and thus the effective viscosity of the gel, provided the amount used does not exceed that comfortably tolerated by the wearer. In this way, even better performance can be obtained.

While hydroxyethyl cellulose may, as mentioned above, constitute the sole adhesive constituent of the composition of the invention, it is preferred to replace a portion of the hydroxyethyl cellulose with a lower alkyl ether of cellulose having the property of viscosity varying directly with temperature. The viscosity-temperature relationship of these compounds is, therefore, the opposite of that of hydroxy-ethyl cellulose and this circumstance is utilized to special advantage in the invention to provide adhesive compositions which exhibit substantially less variation in viscosity over the full range of temperature to which the composition would be subjected in the normal course of use. In other words, the use of a combination of ingredients gives a more stable or balanced product since as the hydroxyethyl cellulose undergoes a loss in viscosity upon temperature rise, the lower alkyl cellulosic ether undergoes a gain in viscosity to thereby maintain the overall viscosity of the mixture within desired limits.

In the triaxial diagram of FIG. 1, the side of the triangle designated 1—2 represents mixes of the hydroxyethyl cellulose and alkyl cellulose ethers over the total range of 0–100% and 100–0%. Within this total range, there have been found suitable mixtures of the two components between the limits indicated by the numerals 4 and 7, i.e., where hydroxyethyl cellulose comprises between 25–90% of the mixture with the alkyl cellulosic ether comprising the remaining 75–10%. Of course, as has already been indicated, the actual upper limit as regards hydroxyethyl cellulose is 100% and lesser amounts of the alkyl cellulosic ether down to 0% can be employed, as is readily seen from the triaxial diagram. However, the contribution of the alkyl cellulosic ether does not become really significant until at least about 10% is present and it is for this reason that 10% is designated as the minimum level of the alkyl ether in two component compositions.

FIG. 2 in curves B–G graphically illustrates the beneficial effect of the addition of the methyl cellulose, for example, to the hydroxyethyl cellulose. The replacement of an amount of hydroxyethyl cellulose as small as 15% by methyl cellulose, while not entirely counteracting the initial relatively large loss in the viscosity at temperatures below 100° F., does cause a striking improvement at higher temperatures; thus, in curve B the viscosity mixture of the 85/15 stays almost completely flat between 120° and 160° F. At the 75/25 proportions (curve C), only an insignificant change is observable over the full temperature range of 80° to 160° F., and for this reason this mixture is deemed optimum for the two-component system. With further increase in the amount of methyl cellulose, an initial rise in viscosity of the system is observed, followed by a falling off in viscosity due to precipitation from the solution of the methyl ether, reducing the effective amount of this constituent present in the solution and the viscosity component attributable to it.

The transformation of the alkyl cellulose ether from the gel state to insolubility is a reversible process so that as the temperature falls, the portion of the ether that was precipitated reverts to gel form and/or colloidal solution form and is not permanently lost from the mixture. Thus, the fact that some of the alkyl ether precipitates at higher temperatures is not an objectionable feature provided the amounts in which it is employed are so established as to avoid too great an overall viscosity loss. For instance, although a mixture of 35% hydroxyethyl cellulose and 65% of methyl cellulose falls off rapidly in viscosity above 120° F. it still exhibits a viscosity equal to or greater than that of the 75/25 mixture over the range of 80° to 130° F. As the proportion of alkyl ether is increased still further, the turning point in viscosity curve is shifted to lower and lower temperatures so that at the 85% level of alkyl ether, the inflection point occurs at 100° F. and drops off very sharply with increasing temperatures until at 160° F. viscosity is merely 1000. In view of these considerations, the minimum level of alkyl cellulosic ether in the preferred range of the invention, i.e. the area II of FIG. 1 is fixed at the point designated 8, i.e., where the alkyl ether comprises about 44% of the mixture.

The preferred alkyl cellulosic ether is methyl cellulose having an average D.S. of 1.4 to 2.6 with 1.8 being preferred and a molecular weight equivalent to a viscosity of 2000 to 6000 determined as hereinbefore described in connection with the hydroxyethyl cellulose. In the drawings methyl cellulose having a D.S. of 1.8 and a "molecular viscosity" of 4000 was employed. In lieu of methyl cellulose, there can be used ethyl cellulose having a D.S. of 0.8 to 1.9 with 1.2 being preferred and a molecular weight such as to give a viscosity of 2000 to 6000 centipoises determined in the same way. Below the above prescribed minimum limits in degree of substitution these ethers are soluble only in cold water or in alkaline water; above the prescribed maximum limits, the compounds become increasingly organosoluble and decreasingly water soluble.

Mention may also be made to another compound that can be employed as the alkyl ether constituent although it is, perhaps, less desirable than the 1 to 2 carbon alkyl ethers due to its greater complexity and concomitant expense. Such a material is hydroxypropylmethyl cellulose consisting of about 22 to 32% methoxy groups and 4% to 12% hydroxy propoxy, i.e. hydroxy propyl, and the remainder cellulose (anhydro-glucose). For such mixed ethers, the average D.S. for methoxy groups is about 1 to 2.5 and for hydroxy propoxy groups, about 0.1 to 0.5 and the "molecular viscosity" is within the range of 2000–6000 cps., determined as above. Like the 1–2 carbon alkyl cellulose ethers, the hydroxypropylmethyl cellulose ethers develop a gel structure at fairly high temperatures. A mixed ether having a D.S. of 0.3 as to hydroxy propoxy and 2.0 as to methoxy groups has a gel temperature of about 145° F. and is preferred among all the possible mixed ethers. Substitution above the prescribed maximum causes the compound to become insoluble at body temperature while substitution below the prescribed minimum brings about gelation at temperatures above that which would be normally expected in the mouth. In the mixed ethers, hydroxyethyl groups may be employed interchangeably with hydroxypropyl groups and give substantially similar results.

It will be observed that the alkyl ethers are so selected as to have a viscosity within the same range, 2000–6000 cps. Therefore, the various specific compounds mentioned may, with appropriate regard for the D.S., be substituted quantitatively for one another without material alteration in the viscosity of the mixture.

In order to demonstrate more conclusively the improvement achieved by the compositions of the present invention, formulation B of the present invention comprising 15% methyl cellulose and 85% hydroxyethyl cellulose and two commercially available denture adhesives were mixed with sufficient water to produce the same viscosity (15,000 cps.) at the same temperature (100° F.). The two commercial preparations selected for this test are respected brands in this particular field and will be identified for present purposes by the initials "F" and "P". As best as can be determined, the first is an alkaline karaya gum while the second is based on pectin. The temperature for all solutions was raised to 140° F. and a viscosity determination was made by the same procedure. A separate portion of each sample was inoculated with 1% of human saliva, allowed to incubate for 24 hours, and tested for viscosity at 100° F. The results of this test are tabulated below in Table I.

*Table I*

| Composition | Gms. used | Viscosity in cps. at | | |
|---|---|---|---|---|
| | | 100° F. | 140° F. | 100° F.[1] |
| Formulation B of Invention | 4.8 | 15,000 | 14,000 | 13,500 |
| Product "F" | 5.4 | 15,000 | 9,500 | 11,000 |
| Product "P" | 6.5 | 15,000 | 10,500 | 600 |

[1] After 24 hours incubation contaminated 1% by human saliva.

It will be seen that the commercial product "P" had lost more than 95% of its viscosity due to the effect of the saliva and about 30% at 140° F. without inoculation. Product "F" was substantially more resistant to saliva losing only about 27% of its viscosity, although it was slightly inferior at the higher temperature without inoculation, having lost about 35% of its viscosity. In distinct contrast throughout, formulation B of the invention exhibited a loss of only about 10% viscosity after inoculation and less than 7% at the higher temperature. It should be noted that larger amounts of both commercial preparations were required to produce a solution having the desired predetermined viscosity, both of these products developing less viscosity than those of the invention per gram of solid material placed in the solution. It is significant, moreover, that formulation B of the invention does not provide as good results under all conditions as some other formulations of the invention as can be seen from FIG. 2.

As a further comparison, the same quantity (200 ml.) of 2% solutions of formulation B as above and Product "F", the best of the two commercial products, were passed twice through the so-called Logeman homogenizer, shown in Patent 2,064,402, in order to indicate the effect on the solutions of mechanical stress and simulate the effect of mastication on the two adhesives. The results of this test are set forth in Table II as follows:

*Table II*

| Composition | Initial Viscosity, cps. | Viscosity after 2 cycles through homogenizer, cps. |
|---|---|---|
| Formulation B | 1,500 | 1,475 |
| Product "F" | 1,564 | 860 |

It will be observed that the commercial preparation lost about 45% of its viscosity while formulation B of the invention lost less than 2% of its viscosity even under the strenuous conditions of the test. The lower initial viscosity used in the test of Table II as compared to the test of Table I was necessary in order to facilitate such a passage of the solutions through the homogenizer. The Logeman homogenizer was selected rather than other homogenizers, for instance, the Waring Blendor, for the reason that it is somewhat less drastic in its homogenizing action and is thus believed to be more comparable to actual conditions of mastication.

On the realization that the above tests are largely laboratory in nature, the following compositions of the present invention have been used under actual conditions for use with dentures in the mouth and compared under the same conditions with commercial preparations such as Product "F" mentioned above: 100/0, 75/25, 66.6/33.3, and 50/50. It has been found that the compositions of the invention are effective for periods of 24 hours as a matter of mere routine and have lasted as long as 48 hours, whereas commercial preparations usually last no longer than from 1 to 3 hours during an active day or overnight when oral activity is naturally at a minimum. Commercial preparations, such as Product "F," which are based on karaya gum have been found to be literally squeezed out from between the denture and adjacent oral surfaces. Nor is it possible to compensate for this defect by an increase in the amount of the preparation employed since the additional amount necessary to obtain the desired viscosity is more than can be comfortably tolerated by the wearer.

While two component mixtures of hydroxyethyl cellulose and lower alkyl cellulose ethers are completely satisfactory and give excellent results as can be noted from the tests already set forth, it is found that an even further improvement can be achieved by the incorporation of a third constituent, polyacrylamide having an average molecular weight sufficient to produce a viscosity of 500 to 3000 cps. at 20° C. when dissolved in amount of 2% by weight in water, the determination of viscosity being made as hereinbefore described. The contribution of polyacrylamide while real, is somewhat difficult to describe in that it is more qualitative than quantitative, or subjective rather than objective. The principal effect of its presence is an improvement in the texture, or "feel," of the adhesive, conferring stringiness or elasticity to the gel or viscous solution produced from the composition. This is possibly due to the essentially linear nature of the polyacrylamide molecule. Some adhesiveness is imparted by the polyacrylamide to the gel and the overall tensile strength is believed to be improved although it is rather difficult to establish this by actual measurement. There is also an effect of elasticization in that the gel is able to stretch and give under strain rather than breaking along a definite line. Perhaps the contribution of polyacrylamide can be best summarized in terms of improved preservation of the continuity or "body" of the gel formed by the composition, enhancing especially the function of the adhesive gel as a barrier to the introduction of the food particles between the denture and the adjacent oral surfaces.

The amount of polyacrylamide that can be employed in the compositions of the invention varies from zero to 20% by weight. At the zero level, of course, there exist merely the two component mixtures already described. Above the 20% level, the gel formed by the composition becomes elastic or stringy to an objectionable extent. 10% appears to be the optimum level of this component. Within the range of 0%–20%, the influence of polyacrylamide upon the viscosity of the colloidal solution or gel produced between the denture and adjacent oral surfaces is not substantial, the polymer acting as regards viscosity in about the same manner as hydroxyethyl cellulose and producing no appreciable change in visosity.

One disadvantage in the use of polyacrylamide is that the monomeric form of this compound is known to be highly toxic and care should be exercised in the preparation of the polymer to insure that no unreacted monomer is present. So far as it is known and can be determined, the polymer itself is inert and is not subject to depolymerization under any conditions that would be expected to obtain in the mouth. However, at the present time, polyacrylamide has not been approved by the Food and Drug Administration as a compound suitable for human ingestion, or for use under circumstances where ingestion is possible as would be the case with denture adhesives. Therefore, until such approval is forthcoming, the use of polyacrylamide in commercial preparations appears contraindicated.

The simplest and least expensive form in which compositions embraced by the invention may be supplied to the consumer is as an essentially dry powder. Completely anhydrous powders on exposure to air will absorb from 3% to 5% moisture, and it is for this reason that the expression "essentially dry" is employed. It is also known to be possible to supply denture adhesives in the form of paste, the product Product "P" being sold in this form. A mixture of 50% water and 50% of any mixture of the present invention appears to provide a satisfactory paste. It is also thought possible to achieve paste-form by incorporating the powdered active ingredients of the invention in an oleaginous vehicle, such as cocoa butter. Under actual conditions of use in the mouth, it would be expected for the water from the mouth to displace the oil in the mix to develop the desired viscous or gel condition. The ratio of active dry ingredients to vehicle can range from 1 to 3 to 3 to 1, particular amounts being largely determined by the individual preference of the manufacturer.

So far as it is known, the compositions of the invention are not particularly or unusually subject to the growth of bacteria or fungi; consequently, there appears to be no great need for the inclusion of various additives such as bactericides, fungicides, et cetera. Obviously, where such additives can be dispensed with, it is preferable to do so, not only for considerations of expense, but also because of the fact that they are usually toxic and must be utilized within narrowly proscribed limits and carefully controlled conditions. However, the adaptability to changes and conditions of the micro-organisms to which the human body is subject makes unwise any far-reaching predictions along these lines, and it is possible that under certain conditions the inclusion of additives such as these will appear indicated. In view of this fact and the further fact that various media may be employed as a carrier for the active ingredients of the invention, use will be made in the claims of the term "consisting essentially of" in the definition of the ingredients present in the composition and will be understood as intended to exclude the presence of other materials in such amounts as to interfere substantially with the properties and the characteristics possessed by the composition set forth, but to permit the presence of other materials in such amounts as not substantially to affect said properties and characteristics adversely.

Having thus described the invention, what is claimed as new and desired to be secured by Letters Patent is:

1. A method of securing a denture in place in the mouth which comprises applying to the face of the denture having contact with oral surfaces an adhesive composition wherein the adhesive component thereof consists essentially by weight of 20–100% of hydroxyethyl cellulose having an average degree of substitution of ethylene oxide groups per anhydro-glucose unit of about 0.4–4.5; 0–75% of an alkyl cellulose selected from groups consisting of methyl cellulose having an average degree of substitution of about 1.4–2.6, ethyl cellulose having an average degree of substitution of about 0.8–1.9, and a hydroxyalkyl methyl cellulose having 2–3 carbon atoms in the alkyl group and an average degree of substitution for hydroxyalkyl groups of about 0.1–0.5 and for methyl groups of about 1.0–2.5; and 0–20% of polyacrylamide.

2. A method of securing a denture in place in the mouth which comprises applying to the face of the denture having contact with oral surfaces an adhesive composition having as the principal adhesive component hydroxyethyl cellulose containing an average of about 0.4–4.5 ethylene oxide groups per anhydro-glucose unit of the cellulose molecule.

3. A method as in claim 2 wherein the molecular weight of the hydroxyethyl cellulose is such that a 2% by weight aqueous solution of said hydroxyethyl cellulose has a viscosity at 20° C. of about 1000–6000 cps.

4. A method as in claim 2 wherein said hydroxyethyl cellulose contains an average of about 1.5–3.0 ethylene oxide groups per anhydro-glucose unit.

5. A method of securing a denture in place in the mouth which comprises applying to the face of the denture having contact with oral surfaces a paste comprising by weight about 25–75% of hydroxyethyl cellulose containing an average of about 0.4–4.5 ethylene oxide groups per anhydro-glucose unit of the cellulose molecule and 75–25% of an inert paste-forming excipient therefor.

6. The method of securing an artificial denture to corresponding oral surfaces which comprises forming between said denture and said surfaces a viscous solution in water of hydroxyethyl cellulose having an average of about 0.4–4.5 ethylene oxide groups per anhydro-glucose unit in the cellulose molecule, said solution containing about 5–10% by weight of said cellulose.

7. A denture adhesive composition having as the adhesion-promoting constituent a mixture of 25–90% of hydroxyethyl cellulose having 0.4–4.5 ethylene oxide groups per anhydro-glucose unit and 10–75% of a lower alkyl cellulose ether, wherein the alkyl group contains an average of about 1–2 carbon atoms, each of said hydroxyethyl cellulose and said lower alkyl cellulose ether being of a molecular weight such as to give in 2% aqueous solution a viscosity at 20° C. of about 2000–6000 cps.

8. The composition of claim 7 wherein up to about 20% of said mixture is replaced by a polyacrylamide having in 2% aqueous solution a viscosity at 20° C. of 500–3000 cps.

9. The composition of claim 7 wherein said mixture includes about 45–90% of said hydroxyethyl cellulose and about 10–55% of said alkyl cellulose ether.

10. The composition of claim 9 wherein up to 10% of said mixture is replaced by a polyacrylamide having in 2% aqueous solution a viscosity at 20° C. of 500–3000 cps.

11. A denture adhesive composition consisting essentially of hydroxyethyl cellulose having 0.4–4.5 ethylene oxide groups per anhydro-glucose unit of the cellulose, a lower alkyl cellulose ether having an average of 1–2 carbons in the alkyl group and a viscosity in 2% aqueous solution at 20° C. of about 2000–6000 cps., and a polyacrylamide having a viscosity in 2% aqueous solution at 20° C. of about 500–3000 cps. in such proportions as to be represented by a point in the triaxial diagram of FIG. 1 lying within the area enclosed by a polygon whose vertices are the points 7, 8, 9 and 10.

12. A method of securing an artificial denture to corresponding oral surfaces which comprises forming between said denture and said surfaces a viscous solution of a composition defined in claim 11, said solution containing 5–10% by weight of said composition.

13. A method of securing a denture in place in the mouth which comprises applying to the face of the denture having contact with oral surfaces an adhesive composition as defined in claim 7.

14. A method of securing a denture in place in the mouth which comprises applying to the face of the denture having contact with oral surfaces an adhesive composition as defined in claim 9.

References Cited in the file of this patent

UNITED STATES PATENTS

| | | |
|---|---|---|
| 1,863,208 | Schorger | June 14, 1932 |
| 2,558,042 | Cornwell | June 26, 1951 |
| 2,701,212 | Brennan | Feb. 1, 1955 |
| 2,771,377 | Greminger et al. | Nov. 20, 1956 |
| 2,840,485 | Greminger et al. | June 24, 1958 |

OTHER REFERENCES

Becker: "Thickening Agents Used in Pharmacy," Amer. Professional Pharmacist, October 1954 (pp. 939–941 and 944).

Gloor et al.: "Hydroxyethyl Cellulose and Its Uses," Ind. and Eng. Chem., vol. 42, page 2150, October 1950.